United States Patent [19]

Aillet

[11] 3,784,914

[45] Jan. 8, 1974

[54] MULTI-STEP PHASE SHIFT MODULATOR DEMODULATOR

[75] Inventor: Claude Aillet, Lannion, France

[73] Assignee: Societe Lannionnaise D'Electroniques, Lannion, France

[22] Filed: Apr. 28, 1972

[21] Appl. No.: 248,729

[30] Foreign Application Priority Data

Apr. 30, 1971 France .............................. 7115675
Mar. 15, 1972 France .............................. 7209028

[52] U.S. Cl. .................... 325/30, 178/67, 325/320, 332/21

[51] Int. Cl. ........................ H04l 27/18, G08c 19/12

[58] Field of Search .................. 178/66 R, 66 A, 67, 178/69.5 R; 325/30, 145, 320, 351; 329/110, 112, 126, 128, 136; 332/16 R, 21

[56] References Cited

UNITED STATES PATENTS 3,100,890 8/1963 Henning .......................... 332/21 X
3,423,529 1/1969 O'Neill ............................ 325/30 X

*Primary Examiner*—Felix D. Gruber
*Assistant Examiner*—R. Stephen Dildine, Jr.
*Attorney*—Paul M. Craig, Jr. et al.

[57] ABSTRACT

A multi-phase shift modulator-demodulator system employs a pair of pulse trains as the information source for phase modulating a carrier wave. The phase differences between selected bit positions of the pulse trains are employed to modulate the carrier wave through the use of typical ring modulators. In the demodulator phase comparison and delay circuitry is employed to extract the clock frequency for removing the information pulse trains.

18 Claims, 4 Drawing Figures

MULTI-STEP PHASE SHIFT MODULATOR DEMODULATOR

The present invention concerns data transmission, and is more particularly concerned with improvements in phase modulation equipment.

The present invention is concerned with differential phase modulation using four phase steps or jumps, and with the associated demodulator.

In classical two-phase differential modulation, information is embodied in the phase shift of the carrier frequency between two successive bit periods. If A is the digital input pulse stream and $\alpha$ the digital output pulse stream of a transcoder applied to a two-phase modulator (for example $\phi = 0°$ for $\alpha = 0$, $\phi = 180°$ for $\alpha = 1$) the transcoder effects the operation:

$$\alpha \left| (n+1)\cdot T \right| = f \left| A(nT), \alpha(nT) \right|$$

This relation, in which T is the bit period, follows the following truth table:

| | $nT$ | $(n+1)T$ |
|---|---|---|
| A = 1 | $\alpha$ | $\bar{\alpha}$ |
| A = 0 | $\alpha$ | $\alpha$ |

The operation $f(A, \alpha)$ requires a certain time $\tau$ which defines the operation speed of the transcoding loop. The minimal duration of a bit period $T_{min}$ must not be less than $\tau$. The maximum frequency is thus limited to $1/\tau$.

In accordance with the present invention there is provided a modulator for modulation by means of four phase steps, adapted to receive two pulse trains $A$ and $B$ comprising a transcoder providing, from the two trains $A$ and $B$, two series of logic signals $\alpha$ and $\beta$, characterized in that the delay between the incident signals $A$ and $B$ and the output signals of the transcoder is equal to twice the bit period $T$.

Using the invention, information is embodied in the phase shift between successive odd-numbered bits and between successive even-numbered bits, rather than in the phase shift between adjacent bits. In this case, the delay time of the transcoding loop can cover two bit periods $2T$ instead of a single period $T$. The maximal speed is then limited to $2/\tau$.

More generally, if information is embodied in the phase shift between two bits separated by ( $m-1$ ) bits, the limiting speed is $m/\tau$.

On demodulation, each incident bit is compared with a bit received $mT$ beforehand, delayed by $mT$, so as to arrive at the demodulator at the same time as the incident bit.

The case $m = 2$ is particularly interesting in that it enables the transmission system to be rendered transparent to the clock signals.

The clock signals are easily recovered by applying alternately positive and negative phase shifts of $\Delta\phi$ to the successive bits. The successive positive and negative phase shifts cancel out for successive even-numbered bits and for successive odd-numbered bits, so that this dephasing operation has no effect on the information embodied.

The invention will now be described in more detail, by way of example only and with reference to the accompanying drawings in which.

Figure 1:
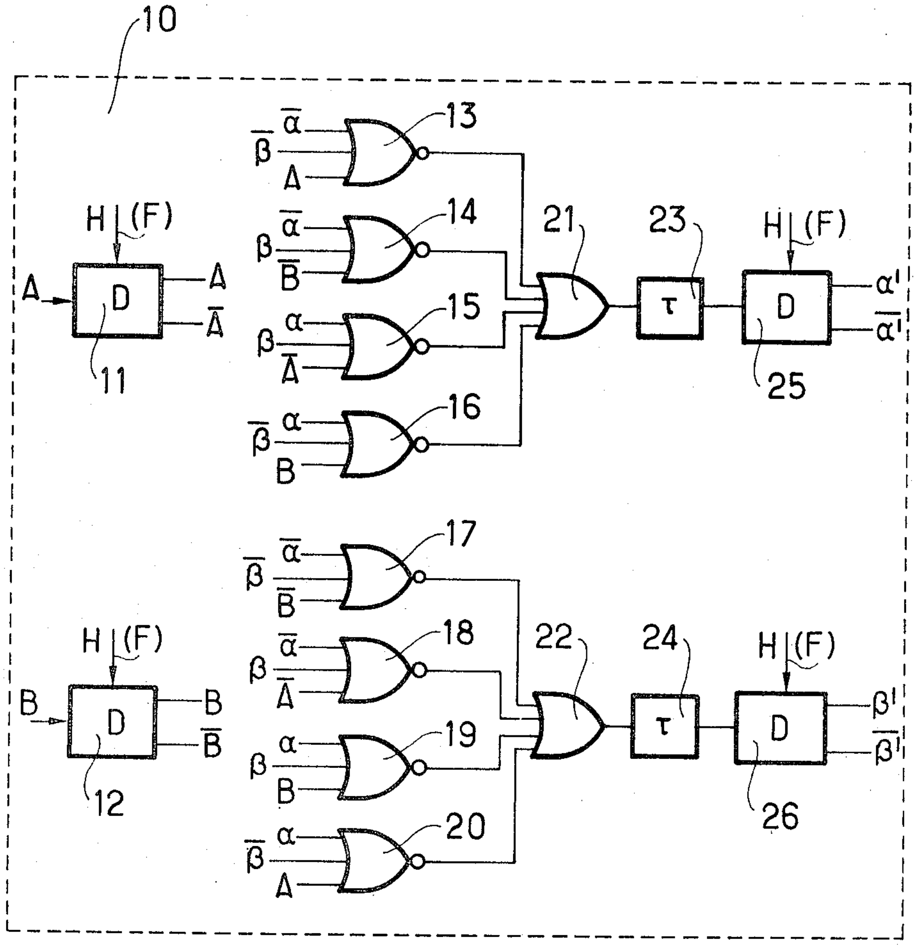
FIG. 1 is a block diagram of a transcoder for a modulator.

Referring to FIG. 1 the transcoder receives input pulse streams A and B. The relation between the four phase steps or jumps and the logic values of the pulse streams A and B is as in the following table:

| $\Delta\phi$ | A | B |
|---|---|---|
| 0° | 0 | 1 |
| 90° | 0 | 0 |
| 180° | 1 | 0 |
| 270° | 1 | 1 |

If $\alpha' = \alpha \left| (n+2)T \right|$, and if $A$ and $B$ are the logic values of the incident pulse streams at time $nT$ and $\alpha$ and $\beta$ are the output logic values of the transcoder at time $nT$, the transcoder must realize the following logic operations:

$$\alpha' = \alpha\beta\bar{A} + \alpha\bar{\beta}B + \bar{\alpha}\bar{\beta}A + \bar{\alpha}\beta\bar{B}$$

$$\beta' = \alpha\beta B + \alpha\bar{\beta}A + \bar{\alpha}\bar{\beta}\bar{B} + \bar{\alpha}\beta\bar{A}$$

These expressions may be rewritten :

$$\alpha' = \overline{\bar{\alpha} + \bar{\beta} + A} + \overline{\bar{\alpha} + \beta + \bar{B}} + \overline{\alpha + \beta + \bar{A}} + \overline{\alpha + \bar{\beta} + B}$$

$$\beta' = \overline{\bar{\alpha} + \bar{\beta} + \bar{B}} + \bar{\alpha} + \beta + A + \overline{\alpha + \beta + B} + \overline{\alpha + \bar{\beta} + A}$$

These relations are those established by the transcoder shown in FIG. 1.

The input pulse streams $A$ and $B$ are applied to $D$ bistable circuits 11 and 12 receiving clock signals $H$ at a frequency $F$. These bistable circuits 11 and 12 provide at their outputs the signals $A$, $\bar{A}$, $B$ and $\bar{B}$.

Eight NOR-gates 13 to 20 each have three inputs. Their input connections will be described shortly.

The outputs of gates 13 to 16 are connected to respective inputs of an OR-gate 21 whose output is connected through an adjustable delay element 23 to the input of a $D$ bistable circuit 25 receiving the clock signals $H$ at frequency $F$.

The outputs of gates 17 to 20 are connected to respective inputs of an OR-gate 22 whose output is connected through an adjustable delay element 24 to the input of a $D$ bistable circuit 26 receiving the clock signals $H$ at frequency $F$.

The input connections to gates 13 to 20 are as follows:

| | |
|---|---|
| **13** : $\bar{\alpha}\bar{\beta}A$ | **17**: $\bar{\alpha}\bar{\beta}\bar{B}$ |
| **14** : $\bar{\alpha}\beta\bar{B}$ | **18**: $\bar{\alpha}\beta\bar{A}$ |
| **15**: $\alpha\beta\bar{A}$ | **19**: $\alpha\beta B$ |
| **16**: $\alpha\bar{\beta}B$ | **20**: $\alpha\bar{\beta}A$ |

It will thus be realized that the signals $\alpha'$ and $\overline{\alpha'}$ are observed at the outputs of bistable circuit 25 and signals $\beta'$ and $\overline{\beta'}$ at the outputs of bistable circuit 26.

The bistable circuits 11, 12, 25 and 26 provide phase calibration of the input and output pulse streams.

The delay elements 23 and 24 adjusted so that the delay time of the loop is equal to two bit periods 2T. The phase steps are thus effectively produced between even-numbered bits on the one hand and odd-numbered bits on the other. The adjustment of elements 23 and 24 is not critical, due to the presence of the bistable circuits 11, 12, 25 and 26.

Figure 2:
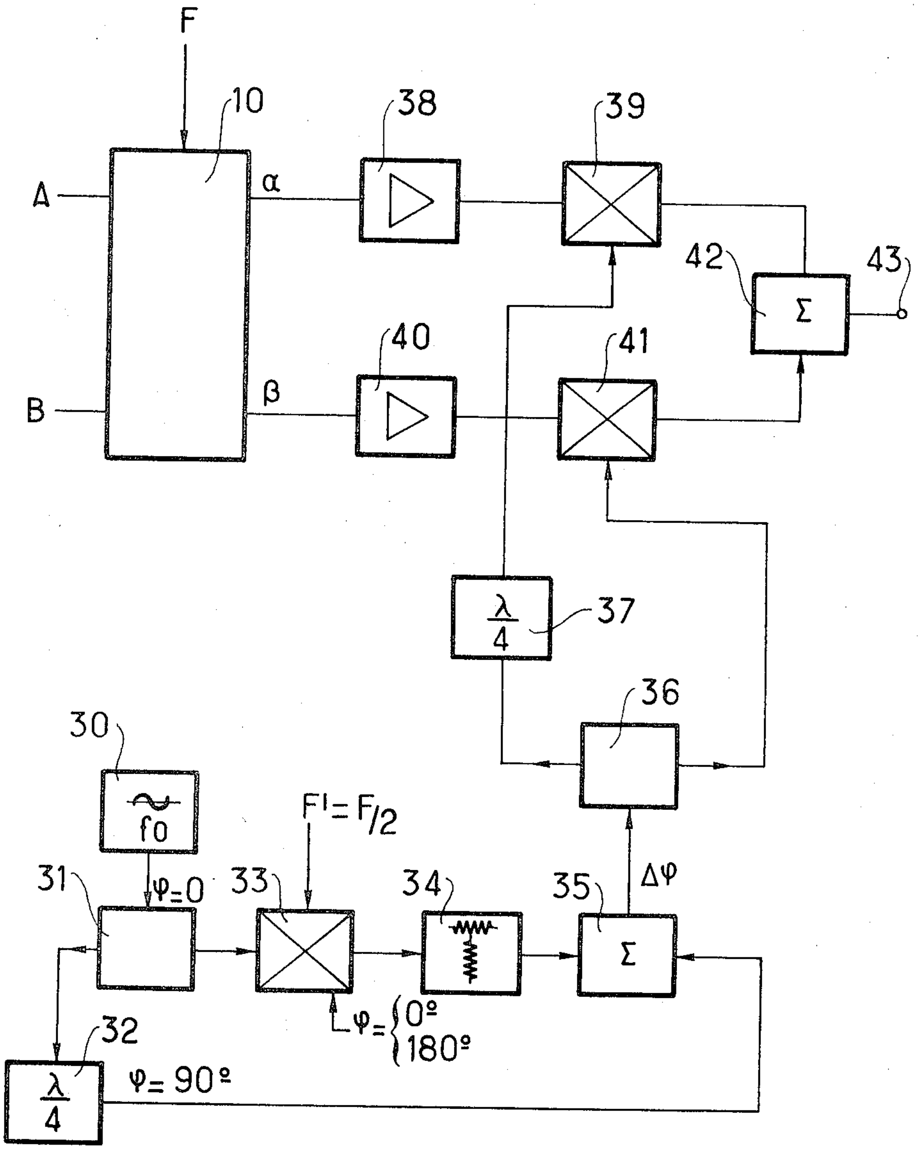
FIG. 2 shows the modulator.

FIG. 2 shows the complete modulator, incorporating the transcoder 10 of FIG. 1.

Referring to FIG. 2, a stable oscillator 30 provides a signal at frequency $f_0$, 500MHz for example. Its output is applied to the input of a splitter 31 providing a two outputs signals indentical in amplitide and phase. One of these is applied to delay line 32, which may be of the coaxial type, for example. The other signal is applied to the input of an inversion modulator 33, which may be a ring modulator, for example which receives a modulation frequency $F' = F/2$. The clock frequency $F$ is equal to $1/T$.

The output of modulator 33 is applied to an adjustable attenuator 34 whose output is applied to one input of an adder 35. The other input of adder 35 is connected to the output of the delay line 32.

The delay line 32 is set so that the phase shift produced by the line is 90° more than that produced by modulator 33.

The attenuator 34 is adjusted to obtain an amplitude ratio between the inputs to adder 35 required to give a given value to the phase shift $\Delta\phi$ at the adder output. For example, to obtain a phase shift $\Delta\phi$ of 22.5° at the output of adder 35, the amplitudes of the two input signals must be in the ratio 1 : 5.1.

The output of adder 35 is connected to the input of a splitter 36 identical to splitter 31. One output of splitter 36 is connected to the input of a delay line 37 identical to delay line 32.

The $\alpha$ output of transcoder 10 is connected to the input of a wide band amplifier 38 associated with a continuous level alignment device. The output of amplifier 38 is connected to the input of an inversion modulator 39 whose other input is connected to the output of delay line 37.

The $\beta$ output of transcoder 10 is connected through a wide band amplifier 40 identical to amplifier 38 to one input of an inversion modulator 41 identical to modulator 39 and whose other input is connected to the other output of splitter 36. The outputs of modulators 39 and 41 are applied to respective inputs of an adder 42 at whose output 43 is obtained the phase-modulated signal.

The composite phase step $\Delta\phi$(the phase step between adjacent bits) cannot take all values, certain values being prohibited.

Firstly, this phase step must not be zero and must be different from all information-carrying phase steps. Thus $\Delta\phi$ must not equal 0°, 90°, 180°, 270°... and so on. Therefore $\Delta\phi \neq k \cdot \pi/2$.

Secondly, all the composite phase steps must be distinct within the range of 360°. Thus $\Delta\phi \neq \pi/4 + k \cdot \pi/2$.

These two conditions, therefore, prohibit eight values of $\Delta\phi$ in the range of 360°, as expressed by the relation : $\Delta\phi \neq k \cdot \pi/4$.

The carrier frequency $f_0$ phase-modulated by means of four phase steps is applied from the output 43 of the adder 42 to a known arrangement ( not shown ) comprising a transmission amplifier and a transmission mixer, supplied with a transposing frequency by a local oscillator. The mixer applies a phase-modulated frequency $f$, of the order of several GHz to a transmission medium such as a waveguide.

Figure 3:
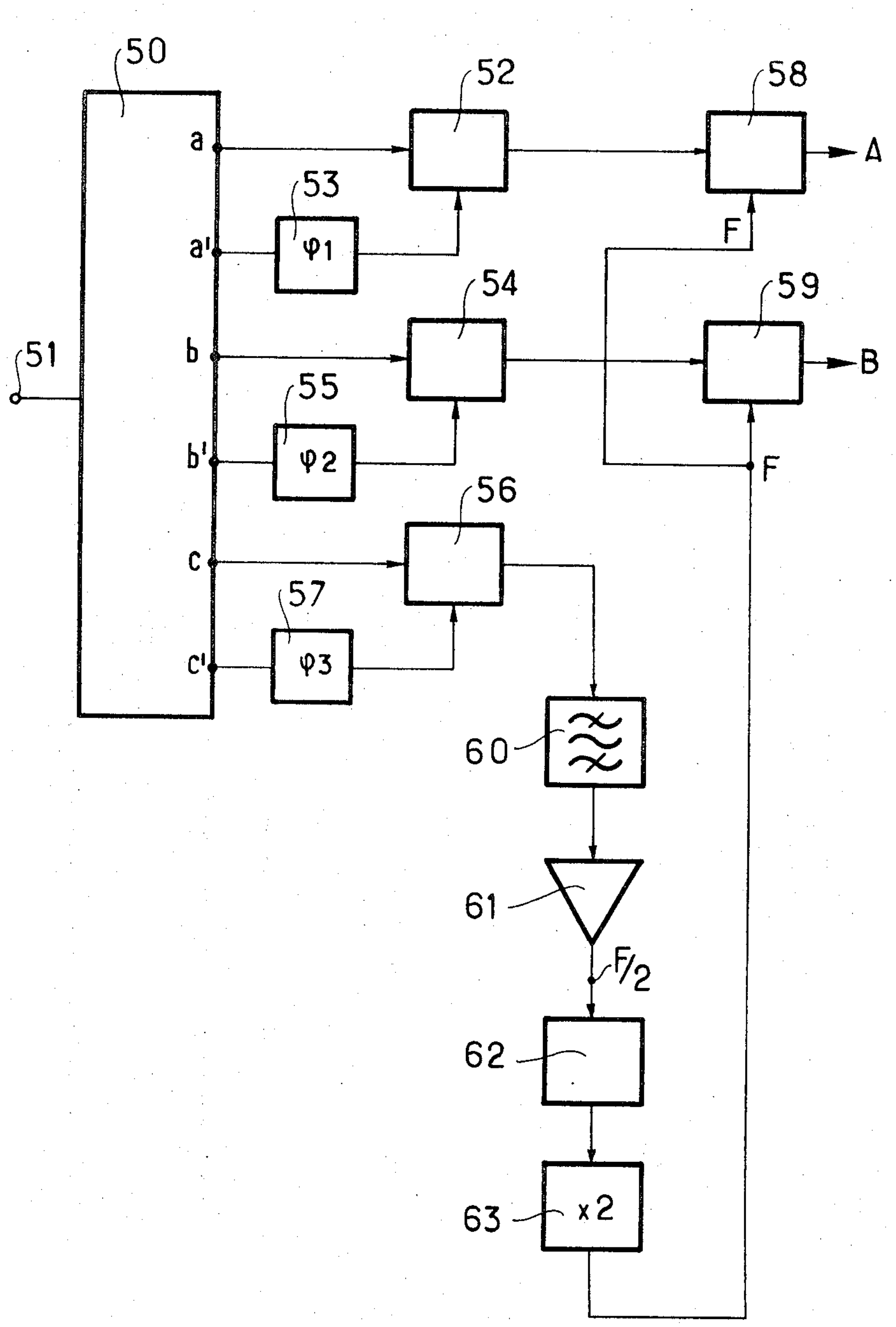
FIG. 3 shows a first form of demodulator.

The other end of the transmission medium is connected to a reception mixer, supplied with the transposition frequency by a local oscillator. The output of the mixer is connected through an amplifier to a demodulator. FIG. 3 shows one form of demodulator for use with the modulator just described with reference to FIG. 2.

Referring to FIG. 3, the phase-modulated carrier frequency $f_0$ is applied to an input 51 of a distributor 50 which distributes the signals between six outputs : $a$, $a'$, $b$, $b'$, $c$ and $c'$. This subdivision is carried out without any phase shift.

Output $a$ is connected to one input of a phase comparator 52, such as a ring modulator. Output $a'$ is connected to the other input of the phase comparator 52 through a delay line 53 which is adjusted to give a delay such that the dephasing $\phi_1$ of the carrier frequency $f_0$ is :

$$\phi_1 = (\pi/4) + k' (\pi/2) + 2k\pi$$

$k$ is chosen so that this delay is as close as possible to $2T$. $k'$ can have one of the integral values 0 to 3.

Output $b$ is connected to one input of a phase comparator 54 identical to comparator 52. Output $b'$ is connected to the other input of comparator 54 through a delay line 55 providing a phase shift:

$$\phi_2 = (\pi 3/4) + k' (\pi/2) + 2k\pi$$

In this equation for $\phi_2$, $k$ and $k'$ are defined as in the equation for $\phi_1$. $k'$ is chosen so that the delays of lines 53 and 55 lie one on each side of $2T$.

Output C is connected to one input of a phase comparator 56 whose other input is connected to output $c'$ through a delay line 57 providing a phase shift:

$$\phi_3 = (3\pi 18) + k'' (\pi/2) + 2k\pi$$

This expression may be rewritten:

$$\phi_3 = (3\pi/8) + k''' (\pi/2)$$

In this equation $k'''$ is so chosen that the delay of line 57 is as close as possible to the bit duration $T$.

The outputs of comparators 52 and 54 are connected to the inputs of respective pulse regenerators 58 and 59. The output of comparator 56 is connected to a band-pass filter 60 having a narrow pass band centered on half the clock frequency. The output of filter 60 is connected to a trigger circuit 62 through an amplifier 61 tuned to the frequency $F/2$. The square waves provided by the trigger circuit 62 are applied to a frequency doubler 63, which may be an EXCLUSIVE-OR gate. The output signal of doubler 63 at frequency F is applied to the pulse regenerators 58 and 59. These consist of bistable circuits providing at their outputs pulse streams A and B respectively identical to the input pulse streams A and B applied to the modulator of FIG. 2.

For consistency with the table of correspondence given in relation to FIG. 1, the following values are taken :

$k' = 2$, $K''' = 0$ . The following values can then be assigned.

| $f_o$ MHz | F MHz | T ns | $\Delta\phi$ | T1 ns | T2 ns | T3 ns |
|---|---|---|---|---|---|---|
| 500 | 93 | 10.75 | 22.5° $=\pi/8$ | 21.25 — $\phi_1= 5\pi/4+20\pi$ | 21.75 — $\phi_2= 7\pi/4+20\pi$ | 10.375 — $\phi_3= 3\pi/8+10\pi$ |

It was shown with reference to FIG. 3 that the phase step is advantageously 22.5°, for the recuperation of the clock signals.

However, it is advantageous to give the phase step as high a value as possible so as to increase the signal-to-noise ratio on reconstituting the clock frequency.

This can be arrived at by multiplying by four the received carrier frequency $f_0$. This neutralizes the dephasing of the information, since the information phase steps which are all multiples of $\pi/2$ appear as multiples of $2\pi$ in the quadrupled frequency. For example, it is advantageous to take $\Delta \phi = \pi/4$, which gives for modulation at the frequency $F$ a periodic modulation in two phases with phase steps of $\pm\pi$, which is the most favorable possible value.

Figure 4:
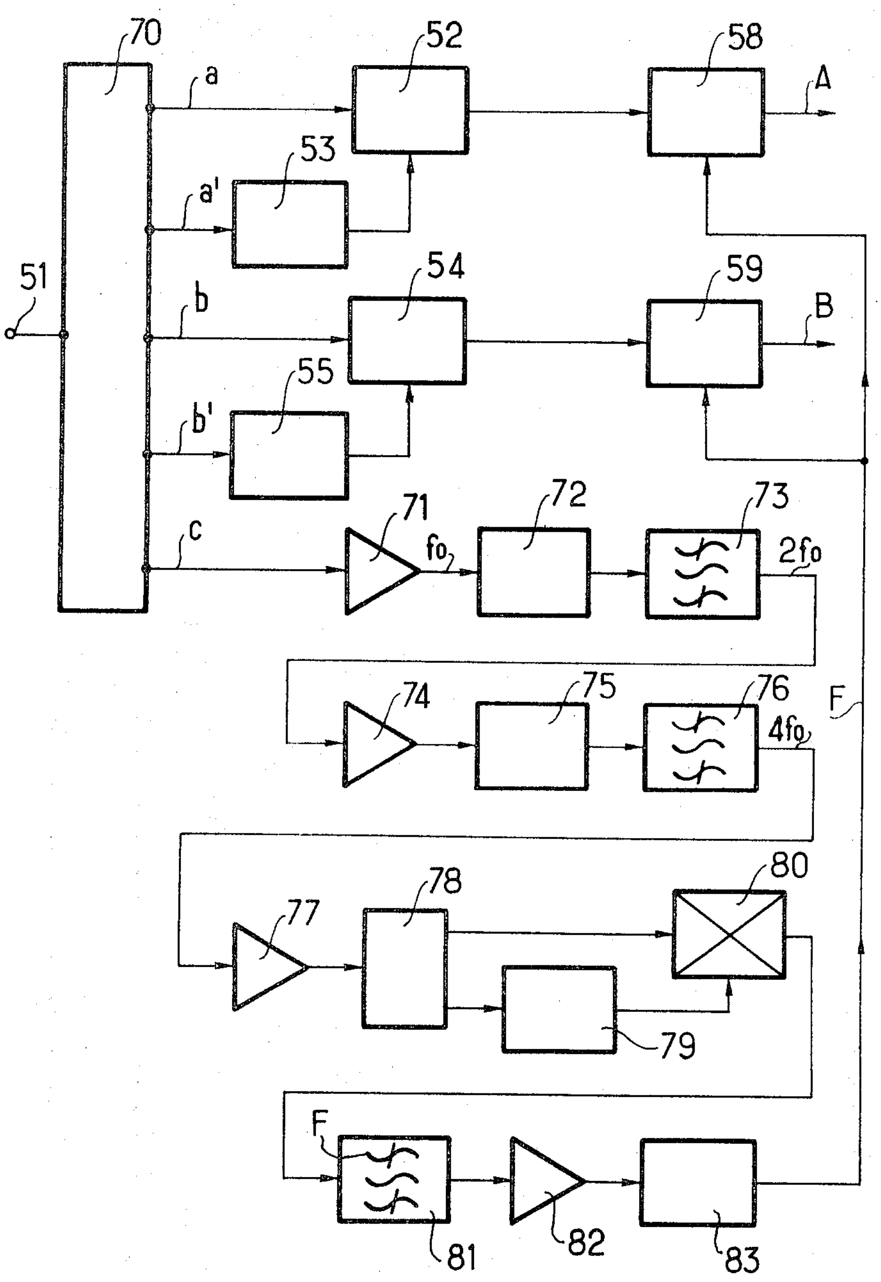
FIG. 4 shows a second form of demodulator.

FIG. 4 shows a demodulator modified along these lines.

The distributor 70 is identical to the distributor 50 of FIG. 3, and the connections to outputs $a$, $a'$, $b$ and $b'$ are as in FIG. 3. Output $c'$ is not used, however, and output $c$ is connected to the input of an amplifier 71. This applies the frequency $f_0$ to a first frequency doubler 72 whose output is connected through a band-pass filter centered on the frequency $2f_0$ to the input of a second amplifier 74. The output of amplifier 74 is connected to the input of a second frequency doubler 75 whose output is connected through a band-pass filter 76 centered on the frequency $4f_0$ to the input of a third amplifier 77.

The output of the third amplifier 77 is connected to the input of a distributor 78 one of whose inputs is connected directly to one input of a phase comparator 80. The other output of distributor 78 is connected to the other input of the comparator 80 through a delay line 79 providing a phase shift $\phi'_3$. The output of comparator 80 is connected through a band-pass filter 81 centered on the frequency $F$ and an amplifier 82 connected to a square wave shaper 83 whose output is connected to pulse regenerators 58 and 59. The delay of line 79 is close to $T/2$ so that $\phi'_3 = 4.2\ \pi f_0$.

I claim:

1. A phase modulator for modulating a carrier wave by a multiplicity of phase shift steps comprising:

first means for receiving first and second input pulse trains and for transcoding said input pulse trains into first and second logic signals, each representative of the relative phase difference between selected bit positions of said first and second respective input pulse trains, the delay time between said first and second input pulse trains and said first and second logic signals being equal to an integral multiple of the bit period, including delay means for controlling said delay time to a value of twice the bit period; and second means, coupled to said first means, for combining said first and second logic signals with a carrier wave to effect the multiple step phase shift modulation thereof.

2. A phase modulator according to claim 1, wherein said first means further includes first and second bistable circuits coupled to the input and output of said delay means for respectively effecting the calibration of the phases of said first and second pulse trains and said first and second logic signals.

3. A phase modulator according to claim 2, wherein said first means further includes respective first and second logic circuits connecting said first bistable circuits to said delay means for combining the outputs thereof and said logic signals according to a preselected logic equation.

4. A phase modulator according to claim 2, wherein said second means comprises means for generating first and second carrier wave signals shifted in phase with respect to each other by a preselected phase angle including a carrier wave generator supplying a carrier wave at a predetermined carrier wave frequency, a first modulator element receiving said carrier wave and modulating said carrier wave at a prescribed fraction of the frequency corresponding to said bit period by providing alternative positive and negative phase shifts to said wave at said prescribed fraction of said bit period corresponding frequency, and means for combining the output of said first modulator element with the output of said carrier wave generator delayed by said preselected phase angle;

second and third modulator elements coupled to the outputs of said carrier wave signal generating means and responsive to said first and second logic signals for modulating said first and second carrier wave signals by said first and second logic signals; and means coupled to the outputs of said second and third modulators for combining the outputs thereof to produce a multiple step phase shifted carrier wave.

5. A phase modulator according to claim 4, wherein said preselected phase angle is 90° and said fraction is one-half.

6. A phase modulator according to claim 5, wherein said means for combining the output of said first modulator element comprising an adjustable attenuator and a summing circuit connected in series thereto.

7. A demodulator device comprising:

first means for receiving an input signal to be demodulated;

second means, coupled to said first means, for producing first and second signals therefrom, comprising first and second circuits each of which includes a delay line and a phase comparator, each having an input coupled to said first means, the output of a respective delay line coupled to an input of a respective phase comparator, the output of each respective phase comparator being connected to an input of a respective pulse regenerator, and further comprising a third circuit including a delay circuit and a phase comparator circuit, each of which has an input coupled to said first means, the output of said delay circuit being connected to the input of said phase comparator circuit, the output of said phase comparator circuit being connected in series with a band-pass filter centered on half the modulation frequency, and a frequency doubler connected thereto, the output of which is applied to said respective pulse regenerators, whereby information signals are produced therefrom.

8. A demodulator device for a system in which information is conveyed over a carrier wave by multiple phase modulation thereof, said phase modulation being in the form of stepped phase shifts between successive respective odd and even numbered bits, comprising first means for receiving a multiple phase modulated carrier wave;

second means, coupled to said first means, for quadrupling the carrier wave frequency;

second means, coupled to said third means for delaying the output thereof and comparing the phase of said delayed output with the phase of the output of said second means; and a band-pass filter and a wave shaping element coupled in series to the output of said third means;

whereby the clock frequency of the information signal by which said carrier wave is modulated is extracted.

9. An information transmission system comprising: first means for generating a carrier wave;

second means, coupled to said first means, for modulating said first means in accordance with information in a plurality of information signal trains, including means for imparting a multiplicity of phase shift steps to said carrier wave in accordance with the respective data in said plurality of information signal trains, including means for receiving first and second input pulse trains and for transcoding said input pulse trains into first and second logic signals, each of which is representative of the relative phase difference between selected bit positions of said first and second respective input pulse trains, the delay time between said first and second input pulses trains and said first and second logic signals being equal to an integral multiple of the bit period of the clock frequency of said input pulse trains; and third means, responsive to the multiple phase modulated carrier wave, for demodulating said carrier wave to obtain the respective ones of said plurality of information signal trains, including means for extracting the clock frequency of said information signals and means for combining said extracted clock frequency with first and second respective phase demodulated components of said carrier wave, to thereby produce the respective ones of said plurality of information signal trains.

10. An information transmission system according to claim 9, wherein said first means comprises an oscillator for producing a carrier wave frequency signal at a prescribed carrier wave frequency, a first modulator element, coupled to the output of said oscillator for modulating said carrier wave frequency signal by a fraction of said clock frequency by imparting alternate positive and negative phase shifts to said oscillator output; and summing means for combining the output of said first modulator element with the output of said oscillator delayed by a preselected phase angle, to thereby provide said carrier wave.

11. An information transmission system according to claim 10, wherein said second means further includes second and third modulator elements, responsive to the outputs of said transcoding means said receiving first and second carrier wave components corresponding to the carrier wave output of said summing means at respective inputs thereof delayed with respect to each other by said preselected phase angle, for modulating said first and second carrier wave components by said first and second logic signals produced by said transcoding means, and means coupled to the outputs of said second and third modulator elements, for combining the outputs thereof to produce a multiple step phase shifted carrier wave.

12. An information transmission system according to claim 11, wherein said third means comprises first and second phase comparators and first and second demodulator delay lines connected to one respective input thereof, the other inputs of said phase comparators and the inputs of said delay lines being coupled to receive the phase modulated carrier wave, and to produce at the outputs of said phase comparators first and second phase compared demodulation signals, and first and second pulse regenerators coupled to the output of said clock frequency extracting means and receiving said first and second respective phase compared demodulation signals for producing first and second demodulated output signals corresponding to said plurality of information signal trains.

13. An information transmission system according to claim 12, wherein said clock frequency extracting means comprising a third phase comparator and a third demodulator delay line connected to one input thereof, the inputs of said third phase comparator and said third delay line being coupled to receive the phase modulated carrier wave, a filter centered at one-half the clock frequency connected to the output of said third phase comparator and a frequency doubling circuit coupled between the output of said filter and the inputs of said pulse regenerators.

14. An information transmission system according to claim 12, wherein said clock frequency extracting means comprises multiplier means, responsive to the phase modulated carrier wave, for generating a signal representative of four times the carrier frequency, a third phase comparator and a third demodulator delay line connected to one input thereof, the inputs of said third phase comparator and said third delay line being coupled to receive the output of said multiplier means, and a filter and a wave shaping circuit coupled in series between the output of said third phase comparator and the respective inputs of said pulse regenerators.

15. An information transmission system according to claim 9, wherein said transcoding means comprises first and second respective pairs of bistable circuits, the first of each pair receiving respective ones of said plurality of information signal trains corresponding to said first and second input pulse trains together with a series of clock pulses, a pair of respective transcoding logic circuits and delay circuits coupled in series between the outputs of said first bistable circuits and the inputs of said second bistable circuits,said second bistable circuits also receiving said series of clock pulses, the outputs of said second bistable circuits being coupled to said second and third modulator elements.

16. An information transmission system according to claim 14, wherein said transcoding means comprises first and second respective pairs of bistable circuits, the first of each pair receiving respective ones of said plurality of information signal trains corresponding to said first and second input pulse trains together with a series of clock pulses, a pair of respective transcoding logic circuits and delay circuits coupled in series between the outputs of said first bistable circuits and the inputs of said second bistable circuits, said second bistable circuits also receiving said series of clock pulses, the outputs of said second bistable circuits being coupled to said second and third modulator elements.

17. An information transmission system according to claim 9, wherein said integral multiple is at least two.

18. An information transmission system according to claim 16, wherein said integral multiple is at least two.

* * * * *